United States Patent [19]

Sherman et al.

[11] Patent Number: 5,907,650
[45] Date of Patent: May 25, 1999

[54] HIGH PRECISION OPTICAL FIBER ARRAY CONNECTOR AND METHOD

[75] Inventors: Jonathan Sherman, Caldwell, Id.; Irfan Camlibel, Oxford, N.J.; Ernest J. Rich, Princeton Junction, N.J.; Theodore C. Rich, Berkeley Heights, N.J.

[73] Assignee: Fiberguide Industries, Inc., Stirling, N.J.

[21] Appl. No.: 08/883,066

[22] Filed: Jun. 26, 1997

[51] Int. Cl.⁶ .................................................. G02B 6/36
[52] U.S. Cl. .......................... 385/80; 385/63; 385/85
[58] Field of Search .............................. 385/43, 63, 60, 385/59, 71, 80, 85, 89

[56] References Cited

U.S. PATENT DOCUMENTS

| | | | |
|---|---|---|---|
| 4,743,084 | 5/1988 | Manning | 350/96.21 |
| 4,755,019 | 7/1988 | Peschko et al. | 350/96.21 |
| 4,812,002 | 3/1989 | Kato et al. | 350/96.18 |
| 4,830,450 | 5/1989 | Connell et al. | 350/96.2 |
| 5,247,597 | 9/1993 | Blacha et al. | 385/88 |

*Primary Examiner*—Hung N. Ngo
*Attorney, Agent, or Firm*—Edward Dreyfus

[57] ABSTRACT

An optical fiber array connector in which the tolerance of the diameter of the mask openings are not factors in the overall positioning of the plurality of fibers. The array includes a mask element with rear and forward surfaces and a plurality of openings that communicate through these surfaces. A plurality of optical fibers include fiber ends having substantially truncated conical side surfaces that extend through the openings and engage the portions of the mask openings nearest the mask rear surface. A method includes preparing the fibers to form a conical surface at their distal ends, preparing the openings in the primary mask each with a diameter less than the diameter of the fiber cladding or second layer, inserting the conical fiber ends until the conical surfaces engage the mask opening walls, applying bonding material to the mask forward surface and exposed tips, grinding and polishing the exposed tips and bonding material surface to truncate the cones and expose the fiber core diameters.

22 Claims, 8 Drawing Sheets

Prepare Fiber

1. Cut Fibers to desired length
2. Strip Jacket to length T
3. Taper fiber Tip to cone of length T
4. Strip Jacket to length J

Prepare Primary Mask

1. Laser cut openings with diameter PMD on rear surface and precise opening spacings.

Assembly

1. Insert fiber ends from rear mask side until cone surface engages respective mask opening walls.

2. Apply bonding material to forward primary mask surface and exposed cone portions and spaces between cone surfaces and mask opening walls.

3. Apply bonding material behind rear mask surface to further bind mask and fibers for strain relief.

4. Grind then polish exposed bonding material and cone tips to remove forward surface portion of bonding material layer and to truncate cone tip beyond CT.

FIG. 1

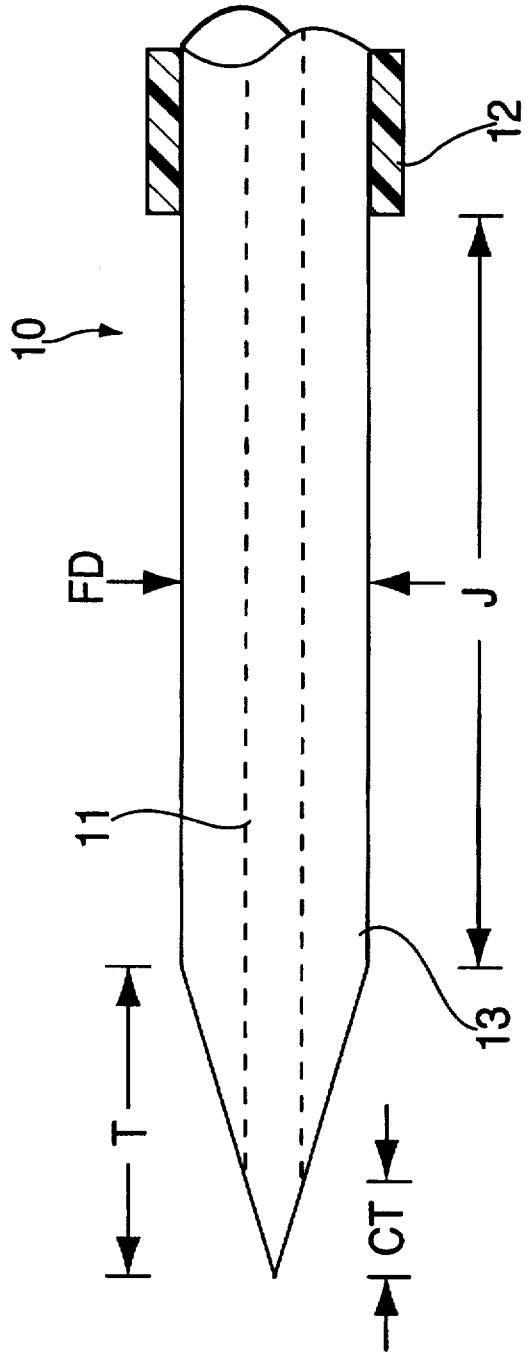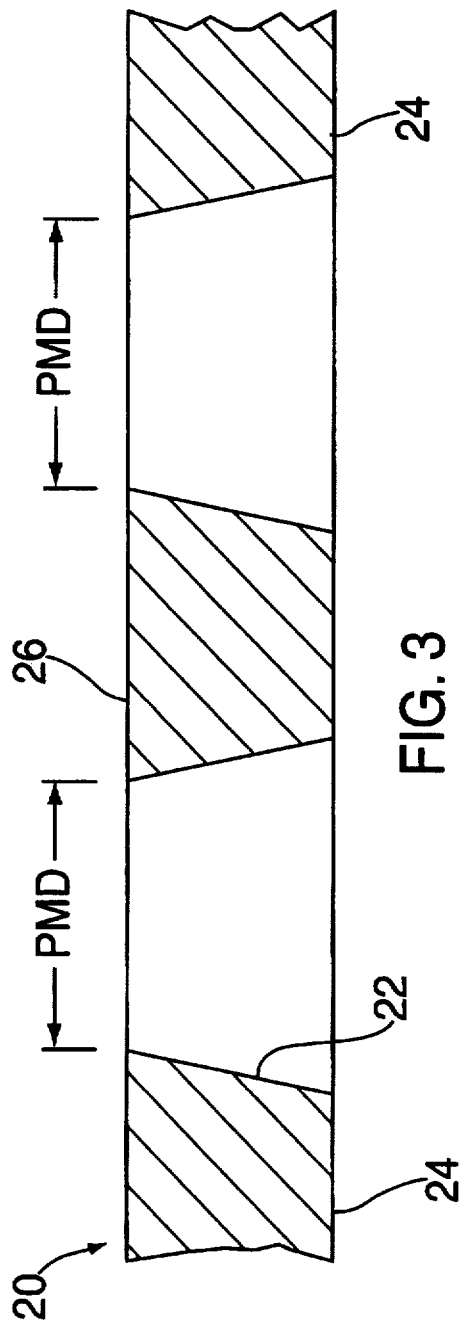

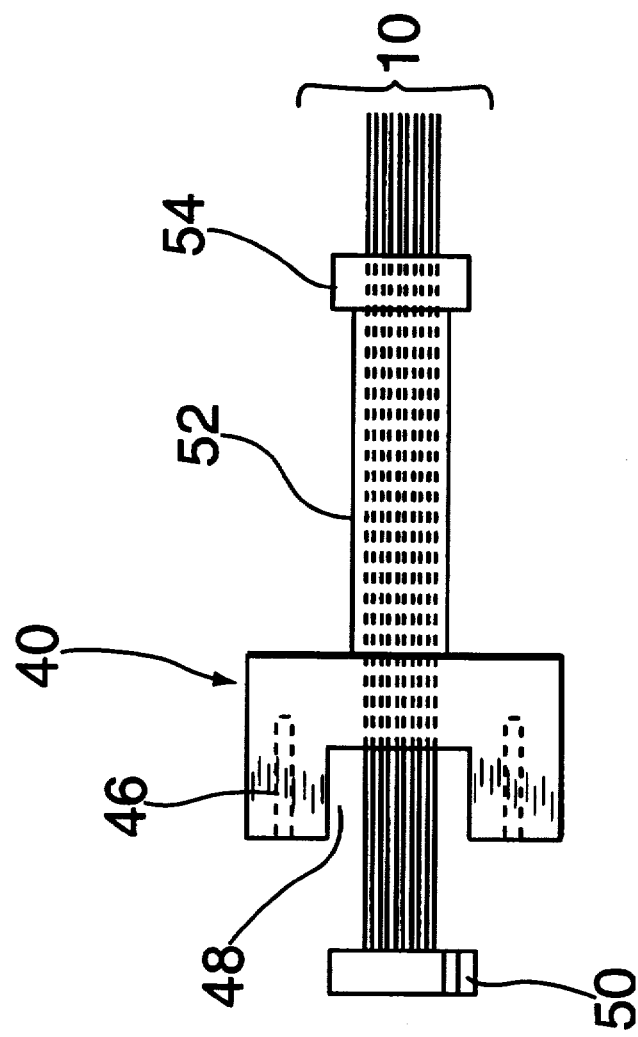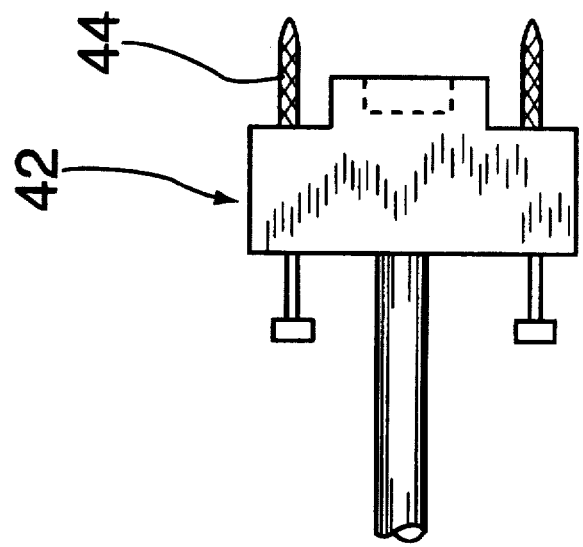
FIG. 10

HIGH PRECISION OPTICAL FIBER ARRAY CONNECTOR AND METHOD

BACKGROUND

The present invention relates to fiber optic arrays and more particularly to high precision fiber optic arrays and methods of making the same.

Fiberoptics has been the driving force in the communication revolution which has enabled carriers to achieve enormous data throughput. In order to realize the full potential of the technology, fiberoptics will be incorporated into every facet of the integrated electronics, which will then make it possible to fully utilize the enormous bandwidth of the optical fiber with the high speeds of the semiconductor integrated circuitry.

To this end, arrays of optical fibers need to be coupled precisely and reliably to semiconductor laser and detector arrays on a chip. Already, various groups throughout the world have demonstrated feasibility of high speed optoelectronic VLSI switching and two dimensional fiberoptic arrays for an optical crossbar switch. See, for example, High-Speed Optoelectronic VLSI Switching Chip with>4000 Optical I/O Based on Flip-Chip Bonding of MQW Modulators and Detectors to Silicon CMOS, Anthony L. Lentine, et al., IEEE Journal of Selected Topics in Quantum Electronics, Vol. 2, No. 1, pp. 77, April 1996, and Fabrication of Two-Dimensional Fiber Optic Arrays for an Optical Crossbar Switch, Geoff M. Proudley, Henry White, Optical Engineering, February 1994, Vol. 33 No.2., pp. 627–635., incorporated herein by reference.

The above publications purport to achieve a fiber array positional accuracy of approximately +/−5 micrometers. However, the fact that the precision achievable with optoelectronic devices such as charge couple devices (CCD's), photodetector and laser using semiconductor technology is almost an order of magnitude (0.5 micrometers) or better indicates a strong need for new switching array designs and manufacturing techniques to attain much better fiber array precision so that these technologies function together.

Fiberguide Industries has already produced 10×10 arrays with positional accuracies (center-to-center spacing error) of better than +/−5 micrometers. The process used takes advantage of the positional accuracy provided by the excimer laser machined 0.010" thick polyimide wafers used in the assembly of the arrays.

Notwithstanding the above mentioned process, a need exists for high precision fiber arrays with center-to-center spacing errors not exceeding ±2 micrometers.

SUMMARY OF EXEMPLARY EMBODIMENTS

A high precision fiber array according to the principles of the present invention achieves the fiber center spacing not to exceed +2 micrometers specification with current excimer laser technology and perhaps better results with future laser technology. This high precision is obtainable for single mode and multimode fibers.

This new precision is obtainable according to an embodiment of the present invention by imparting a hole diameter in the mask that is less than the minimum diameter of each respective fiber. The fiber ends are processed into a cone-shaped tip which is inserted into respective holes until the cone surfaces make good contact with the walls of the openings with potentially various tip lengths protruding from the opposite side of the mask. Each cone is shaped such that the fiber cone extends through the mask opening sufficiently to enable the full core cross section to be exposed after the fiber ends have been ground and polished, for example, as described below. This unique arrangement and method eliminates the hole diameter variation of ±2 micrometer as an element or problem that contributes to imprecise fiber spacing. The exposed tips and holes then receive epoxy or other suitable bonding material to firmly secure the tips and mask. The completed assembly is then ground and polished and tested in the usual manner.

In one preferred embodiment, a guide mask cooperating with the above mentioned primary mask serves to guide the fiber ends into alignment with the opening in the primary mask during assembly.

Also, the mask/fiber holder can be part of the final connector for ease of assembly.

DRAWINGS

Other and further advantages and benefits will become apparent with the following detailed description of exemplary embodiments when taken in view of the appended drawings, in which:

FIG. 1 is a list of salient steps to one example of the method according to the principles of the present invention.

FIG. 2 is a partial section view of a fiber end prepared according to the method of FIG. 1.

FIG. 3 is a partial section of a primary fiber mask or wafer according to the present invention.

FIG. 10 is an exploded view of a connector according to the present invention including the parts shown in FIG. 9 and the semiconductor chip holder.

DETAILED DESCRIPTION OF PREFERRED EMBODIMENT

Figure 4:
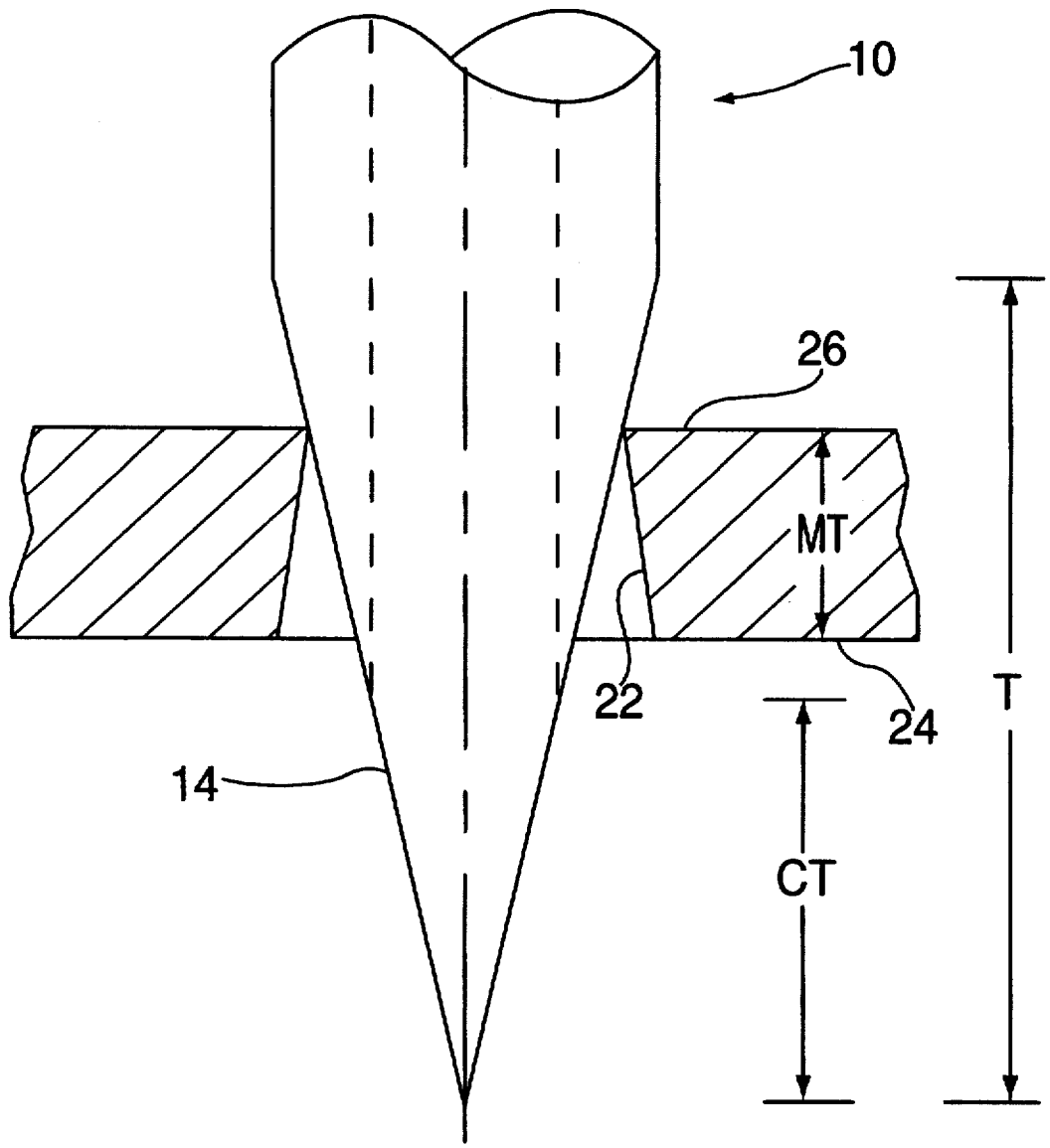
FIG. 4 is a partial section of the fiber tip of FIG. 2 inserted into the primary mask opening of FIG. 3.

With reference to FIGS. 1 to 4, a method according to the principles of the present invention includes preparation of the optical fibers 10 by cutting a number of fibers to desired length. Each fiber includes a central core 11, a second or cladding layer 13 and a protective buffer, coating, or jacket 12. One end of each fiber is processed so that the outer jacket 12 (eg plastic, acrylic, NYLON, etc.) is stripped to expose a predetermined length T. A standard hot sulfuric acid strip technique can be used to strip most jackets. Thereafter, the exposed fiber tip is shaped to form a conical tip 14. In one example, the bare fiber tip with a fiber diameter (FD) is dipped into hydroflouric acid for about 10 minutes then rinsed and dried.

Figure 9:
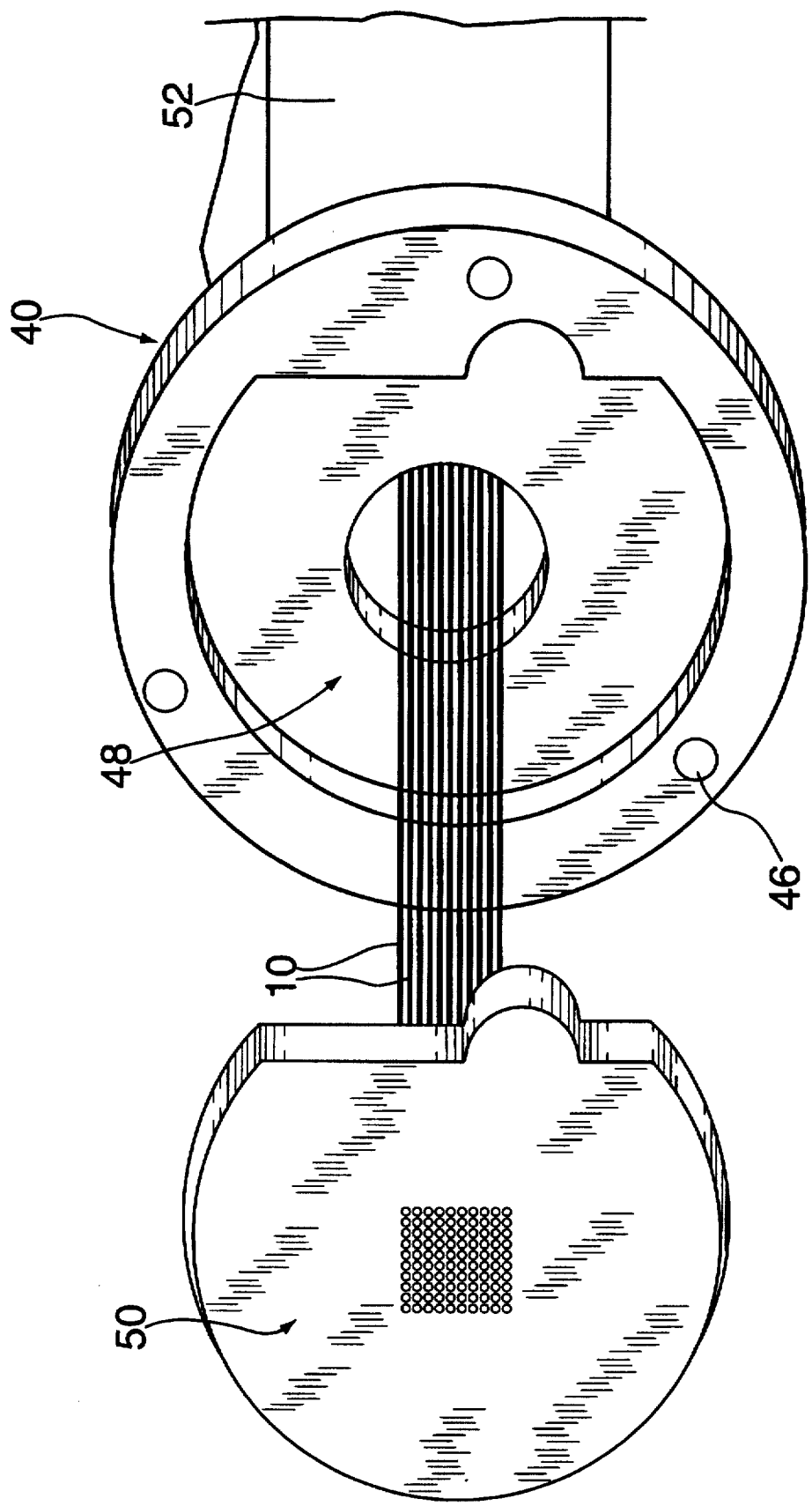
FIG. 9 is a partial perspective of the fiber holder and fiber-wafer sub-assembly according to the present invention.

The primary mask 20 according to the principles of the present invention can be made of any suitable material including polyimide, ceramic or metal. Fiber openings are preferably laser cut from the rear (fiber insertion) side in any suitable predetermined pattern with predetermined spacing. One exemplary pattern is shown in FIG. 9, ie. a 10×10 array.

As better seen in FIG. 4, because each primary mask opening is laser cut, the wall 22 forming the opening is slightly flared outward from the central opening axis in the direction of the forward surface. Accordingly, the primary mask opening diameter (PMD), which can be precisely placed within ±1 to ±1.3 microns in the X, Y plane, can be made accurately to within ±2 microns at the rear surface 26. As seen below, the precision accuracy of the PMD, the nature of the flaring walls 22, and the diameter of each opening at the forward surface 24 of primary mask 20 are all insignificant according to the present invention. This results from the requirement that PMD must be selected to be less than the fiber diameter FD. Also, PMD should be great enough to enable enough of the fiber tip 14 to exit the forward mask surface 24 so that the full core diameter is exposed after polishing described below.

To assemble the array, each prepared fiber 10 is inserted into respective mask openings from the rear surface until the tip conical surface 14 engages the wall 22 of the opening. See FIG. 4. This engagement stops the forward insertion of the fiber.

It will be understood that various inserted fibers 10 may have various portions of their conical tips 14 exposed beyond the forward mask surface 24, at least in part because of the various dimensions within the ±2 micron tolerance of the mask openings PMD. Nevertheless, the extent of this exposure beyond the forward mask surface 24 is insignificant provided it extends beyond the polishing plane as described below.

Figure 5:
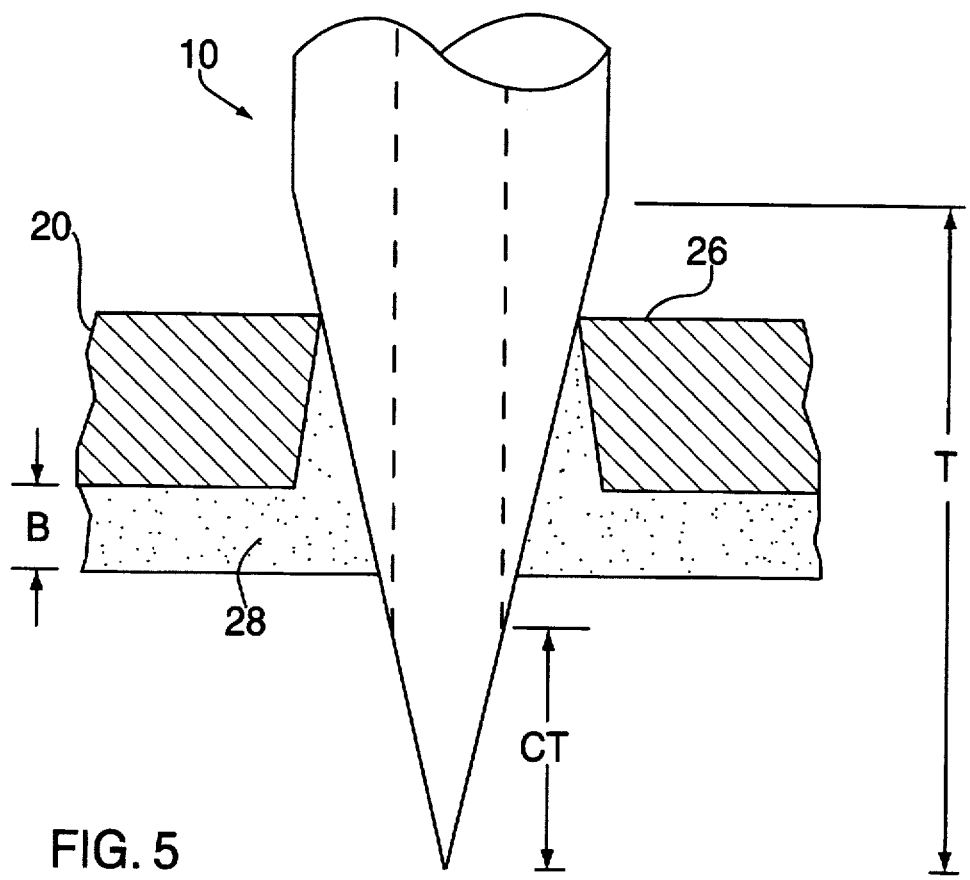
FIG. 5 is the same as FIG. 4 after bonding material is applied.

After all fibers are fully inserted as described, bonding material, such as an epoxy film 28, is applied (see FIG. 5) to a depth B covering the forward mask surface 26 and filling the space within the mask openings generally as shown. One example of epoxy is Epo-tec 301, a trademarked product owned by Epoxy Technologies, Inc. If desired, an additional layer of epoxy (not shown) such as Epo-tec 302-3, can be laid onto the film epoxy layer 26 to provide a better grinding surface.

Thereafter, the fiber tips 14 and epoxy layer 28 are ground and polished to remove the epoxy and to truncate the cone tip 14 thus leaving the full core cross section 30 exposed and oriented substantially parallel to and substantially within the planes of the other exposed fiber cores 30. In general, standard grinding and polishing procedures can be used to accomplish this.

The following sets forth in one example of the method and array according to the present invention:

Fiber Mode—single
Fiber Material—glass
Fiber Jacket—Acrylate
Fiber Length—19 inches
FD—125±0.6 microns
Core Diameter—8 to 9 microns
T—0.25 inches
J—1.0 to 2.25 inches
Primary Mask Material—polyimide
Mask Thickness (MT)—250 microns
Pattern—10×10
PMD—122±2 microns
B—Less Than Tip Exposure
EPOXY Material—Epo-tec 301

According to another exemplary embodiment of the present invention, a guide mask 32 can be provided to guide fiber tips 14 through openings in the primary mask 20. Guide mask 32 can be made of the same or different material as primary mask 20 and is provided with opening walls 34 with a guide mask opening diameter (GMD) that is slightly larger than FD. Walls 24 can be laser cut and function primarily to guide tip 14 into proper alignment with primary opening wall 22 and to provide greater strain relief and lateral stability for fiber 10 when its rear surface 36 and the space between wall 34 and fiber tip 14 are filled with bonding material, not shown. Initially, guide mask 32 is allowed to float on primary mask 20 until epoxy is applied to surface 36 after which the entire assembly is bonded together.

Figure 8:
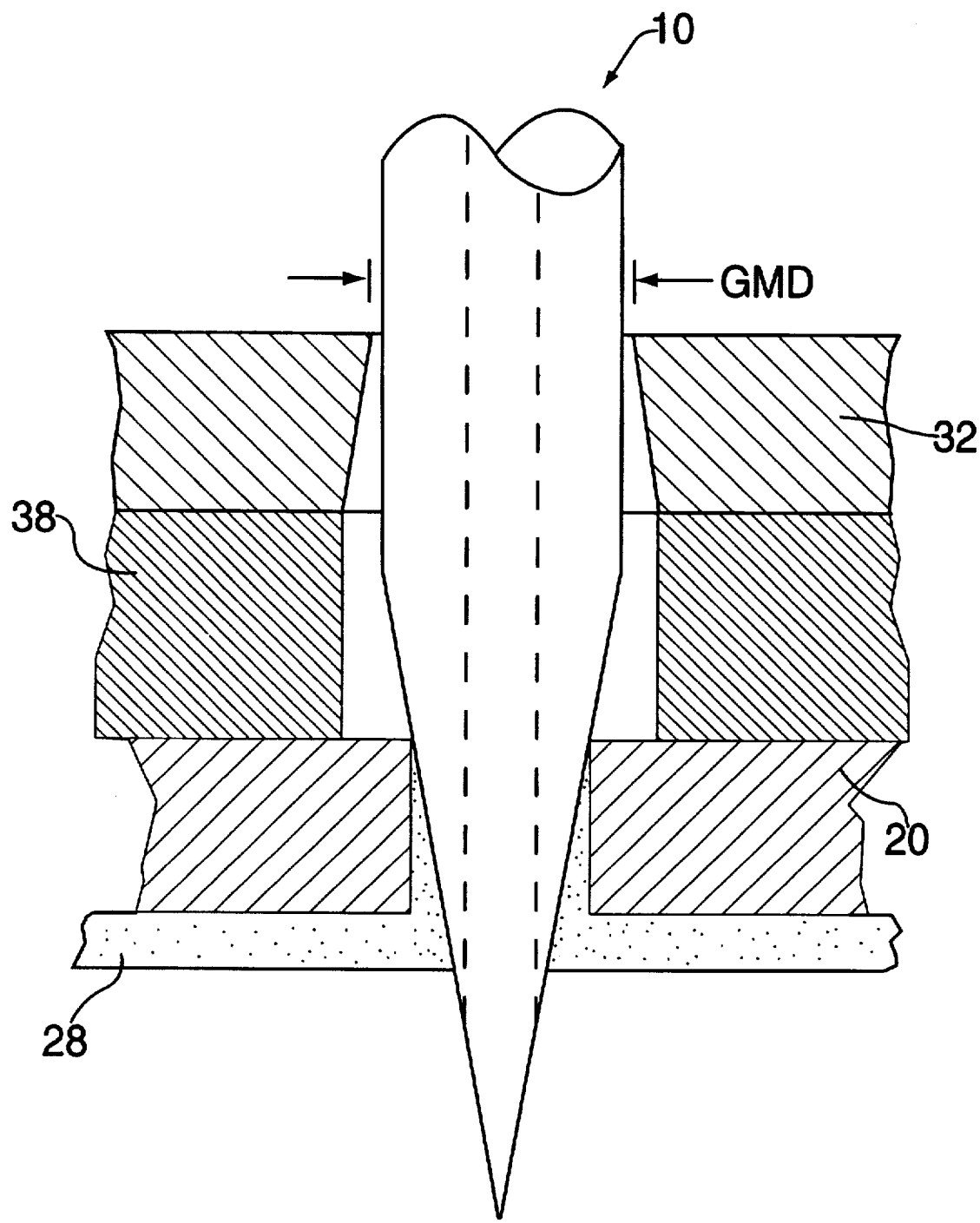
FIG. 8 is the same as FIG. 5 showing yet another alternate embodiment according to the present invention.

A further exemplary embodiment is shown in FIG. 8 in which guide mask 32 is spaced longitudinally from primary mask 20 by a spacer element 38. Element 38 can be made of metal, alloy, hard plastic or other suitable material. In addition, it need not define a separate opening about each or any fiber tip 10 because it only performs a spacer function and preferably not a guide function. If desired, spacer 38 can be located outside the periphery of the outermost fibers in the array, see FIG. 9.

Figure 6:
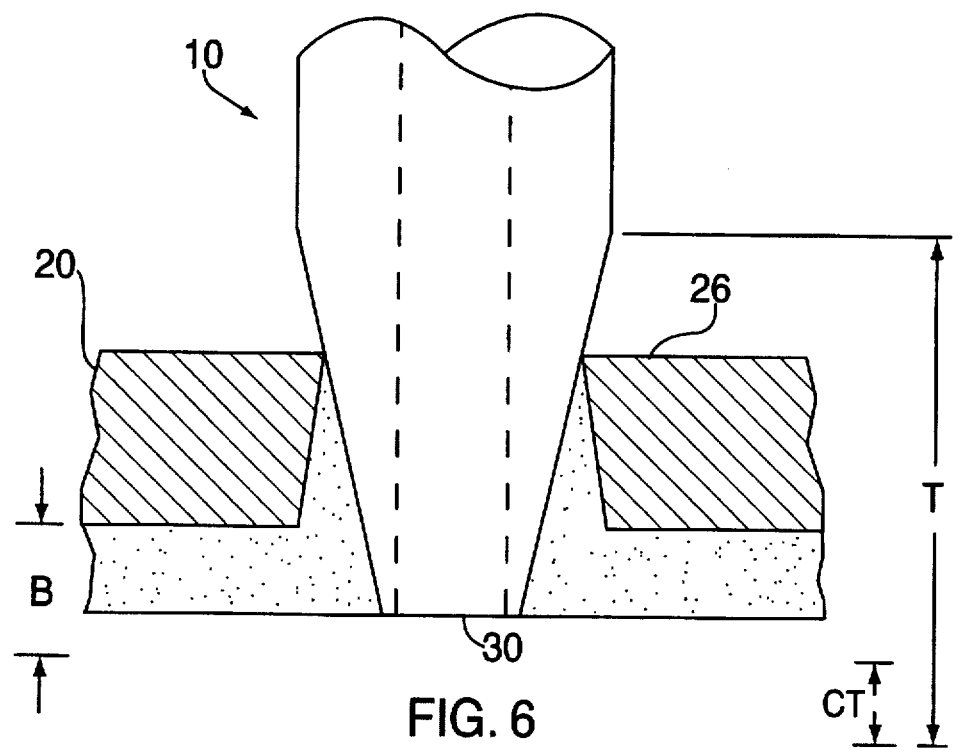
FIG. 6 is the same as FIG. 5 after the forward surface has been ground and polished.
Figure 7:
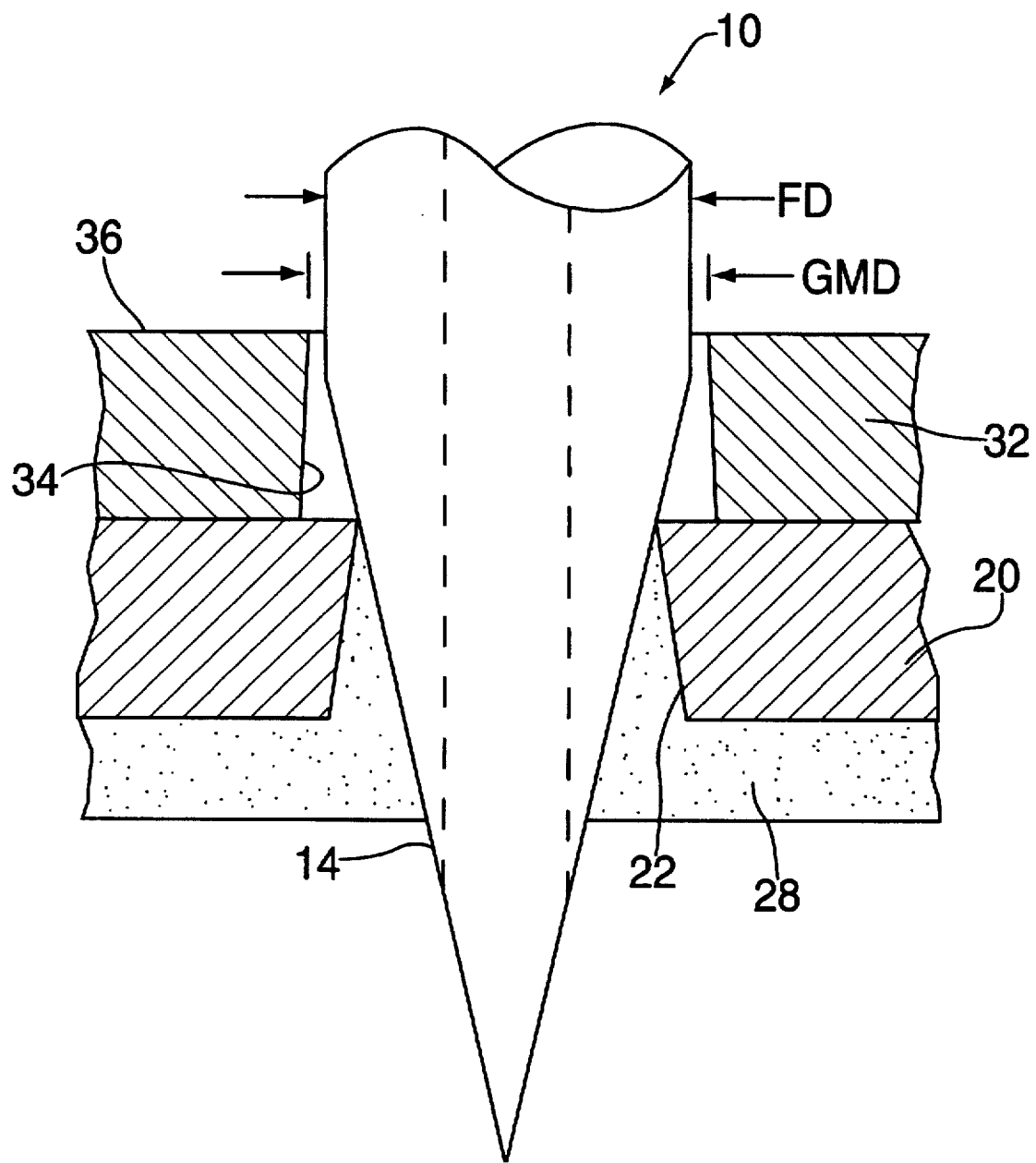
FIG. 7 is the same as FIG. 5 showing an alternate embodiment according to the present invention.

With references to FIGS. 9 and 10, there is shown parts of one example of a connector that includes a fiber array holder 40 and a semiconduct device holder 42 with fasteners 44 that thread into female counterparts 46 in the fiber array holder 40. Holder 40 includes a keyed recess 48 that matches the keyed wafer sub-assembly 50 which secure fiber tips 14 of fibers 10 as described above. Fibers 10 extend through a hollow handle 52 that includes a standard fiber strain relief device 54 (shown schematically) near the rear end of handle 52. Epoxy or other suitable material is applied to the inner and/or bottom wall of recess 48 and the sub-assembly 50 inserted with precise, keyed orientation. Once assembly 50 is secured to holder 40, the exposed tips 14 of fibers 10 and the forward surface of epoxy 28 can be ground and polished, using holder 40 as a fixture for such operations. Once the forward surface is prepared as desired, holder 42 is precisely fitted to holder 40 and secured with fasteners 44. In this way, the minute semiconductor devices on the associate substrate within holder 42 can be precisely aligned and juxtapositioned with each respective facing fiber core surface 30, see FIG. 6.

Alternatively, other well known mechanical means can be incorporated in a similar manner to orient and align the fiber array to the array of integrated optoelectronic devices such as detectors or to another fiber array for coupling purposes prior to fastening the parts mechanically.

It will be understood that the drawings hereof are not necessarily drawn to scale and that the above mentioned "cones" or "conical" need not be exact "cones" or "conical" and could be pyramids or pyramidal or hybrid pyramidal-conical shapes. The term cones and conical are intended to include these shapes as well. Also, other changes and improvements can be made to the herein disclosed embodiments without departing from the spirit and scope of the present invention.

We claim:

1. An optical fiber array connector comprising a primary mask element having a rear surface and a forward surface and a plurality of mask walls defining mask openings that communicate through said rear and forward surfaces;

at least two optical fibers each comprising a core, a second fiber layer extending over said core and a jacket extending over a portion of said second layer;

each said optical fibers having one end in which said second layer and core extend beyond the jacket and in which the distal portion of said second layer has a substantially truncated conical side surface, said substantially truncated conical side surface extending entirely through the respective one of said wall openings and engaging a portion of said respective mask wall located substantially contiguous to said rear surface.

2. A connector according to claim 1, wherein the smallest dimension of said truncated conical side surface is equal to or greater than the diameter of said core.

3. A connector according to claim 2, wherein the extreme ends of said core and truncated conical side surface extends forward of the forward mask surface, and said extreme ends are polished to a plane that is generally parallel to said forward mask surface.

4. A connector according to claim 1, wherein said truncated conical side surface has at least a forward portion spaced from said respective mask wall, and bonding material located in said space for bonding together said truncated conical side surface and said respective mask wall.

5. A connector according to claim 4, wherein said bonding material is located on said forward mask surface and has a forward surface that has been ground.

6. A connector according to claim 1 further comprising a fiber guide mask having a rear guide surface and a forward guide surface, and having guide openings for guiding a respective plurality of fiber ends through the respective rear portions of said mask openings.

7. A connector according to claim 6, wherein said forward guide surface contacts said rear surface.

8. A connector according to claim 6, wherein said forward guide surface is spaced from said rear surface.

9. A method of making an optical fiber array comprising:

preparing at least two optical fibers by cutting them to desired lengths, forming the core and second layers of one tip of each fiber into a conical shape;

preparing a mask wafer by forming a plurality of spaced fiber openings communicating between the rear and forward surfaces of the wafer, at least two of said openings each having a wall portion contiguous to said rear surface with a transverse direction less than the largest diameter of said fiber second layers;

inserting the tip of each fiber into a respective openings so that the conical side wall of the tip engages the mask opening wall at said wall portion to stop the forward insertion of the fiber tip and the forward end of the tip extends beyond the forward surface of the mask, and securing the two fibers to the mask wafer.

10. A method of making an optical fiber array according to claim 9 further including after said securing step removing the extreme end of the tip until at least the substantially full diameter of the core of each of the two fibers is exposed.

11. A method of making an optical fiber array according to claim 9 wherein securing comprises applying bonding material to the forward surface of said mask wafer and the tips of the two fibers extend beyond the forward surface.

12. A method of making an optical fiber array according to claim 11 wherein securing further comprises applying bonding material between the walls of the mask openings and the fiber tips positioned therein.

13. A method of making an optical fiber array according to claim 9 wherein said inserting includes guiding said fibers into the respective openings with the use of a guide mask.

14. A method of making an optical fiber array according to claim 13 wherein said guide mask has a plurality of guide openings each aligned with a corresponding mask opening and each guide opening having a diameter greater than the greatest diameter of said conical side wall.

15. A method of making an optical fiber array according to claim 14 wherein said guide mask contacts said mask.

16. A method of making an optical fiber array according to claim 14 wherein said guide mask is spaced from said mask.

17. An optical fiber array made by the method of claim 9.

18. A method of making an optical fiber array comprising:

preparing at least two optical fibers by cutting them to desired lengths, forming the core and second layers of one tip of each fiber into a conical shape;

preparing a mask wafer by forming a plurality of spaced fiber openings communicating between the rear and forward surfaces of the wafer, at least two of said openings having a transverse direction less than the largest diameter of said fiber second layers;

inserting the tip of each fiber into a respective openings so that the conical side wall of the tip engages the mask opening wall and the forward end of the tip extends beyond the forward surface of the mask and securing the two fibers to the mask wafer;

removing the extreme end of the tip until at least the substantially full diameter of the core of each of the two fibers is exposed; and wherein said removal step includes one of grinding and polishing the tip of the cones in a direction generally parallel to the forward surface of the mask wafer.

19. An optical fiber array made by the method of claim 18.

20. An optical fiber array connector comprising a primary mask element having a rear surface and a forward surface and at least two mask walls defining at least two mask openings that communicate through said rear and forward surfaces;

at least two optical fibers and a jacket extending over a portion of each of said fibers;

each said optical fibers having one end extending beyond the jacket and in which the distal portion of said end has a substantially truncated conical side surface, said substantially truncated conical side surface extending entirely through one of said mask openings and engaging a portion of the respective mask wall located substantially contiguous to said rear surface.

21. A method of making an optical fiber array comprising:

preparing at least two optical fibers by cutting them to desired lengths, forming the core and second layers of one tip of each fiber into a conical shape;

preparing a mask wafer by forming a plurality of spaced fiber openings communicating between the rear and forward surfaces of the wafer, at least two of said openings having a transverse direction less than the largest diameter of said fiber second layers;

inserting the tip of each fiber into a respective openings so that the conical side wall of the tip engages the mask opening wall and the forward end of the tip extends beyond the forward surface of the mask, and securing the two fibers to the mask wafer;

securing comprises applying bonding material to the forward surface of said mask wafer and the tips of the two fibers extend beyond the forward surface; and wherein said removal includes grinding a portion of the forward surface portion of the bonding material.

22. An optical fiber array made by the method of claim 21.

* * * * *